United States Patent
Rachalwar et al.

(10) Patent No.: US 9,330,280 B2
(45) Date of Patent: May 3, 2016

(54) IDENTITY MANAGEMENT, AUTHORIZATION AND ENTITLEMENT FRAMEWORK

(71) Applicant: VERIZON PATENT AND LICENSING INC., Arlington, VA (US)

(72) Inventors: Vivek Rachalwar, Irvine, CA (US); Vineet Fernandes, Kirkland, WA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 21 days.

(21) Appl. No.: 14/301,231

(22) Filed: Jun. 10, 2014

(65) Prior Publication Data

US 2015/0358331 A1 Dec. 10, 2015

(51) Int. Cl.
  *G06F 21/62* (2013.01)
  *H04L 29/06* (2006.01)
  *H04W 12/08* (2009.01)
  *H04L 29/08* (2006.01)

(52) U.S. Cl.
  CPC .......... *G06F 21/629* (2013.01); *H04L 63/0815* (2013.01); *H04L 63/102* (2013.01); *H04L 63/105* (2013.01); *H04W 12/08* (2013.01); *H04L 67/306* (2013.01)

(58) Field of Classification Search
  CPC ... G06F 21/62; G06F 21/6218; G06F 21/629; H04L 63/10; H04L 63/101; H04L 63/102; H04L 63/104; H04L 63/105; H04L 63/08; H04L 63/0815
  See application file for complete search history.

(56) References Cited

U.S. PATENT DOCUMENTS

| | | | | |
|---|---|---|---|---|
| 6,308,161 B1* | 10/2001 | Boden | ................. | G06Q 10/063 700/117 |
| 6,892,201 B2* | 5/2005 | Brown | ................ | G06F 21/6218 |
| 6,944,677 B1* | 9/2005 | Zhao | ...................... | G06Q 30/01 707/999.01 |
| 7,818,409 B2* | 10/2010 | Chandrashekhar | . | H04L 12/4641 370/230 |
| 8,141,140 B2* | 3/2012 | Wenzel | ................... | G06F 21/41 713/182 |
| 9,081,645 B2* | 7/2015 | Bakthavachalam | ....... | G06F 8/70 |
| 2005/0114435 A1* | 5/2005 | DiPlacido | ............. | H04L 69/329 709/202 |
| 2009/0132537 A1* | 5/2009 | Denton | ................. | G06F 21/604 |
| 2014/0040712 A1* | 2/2014 | Chang | ................... | G06F 17/212 715/202 |

* cited by examiner

Primary Examiner — Zachary A Davis

(57) ABSTRACT

A system and method are provided for identity management of applications on computing devices. A set of applications is registered at an identity management system. Each application allows a different level of access permission to the application based on a user role associated with a user accessing the application. A set of user profiles associated with users are received. Each user profile includes a login credential for allowing access to the applications and a user role for defining a user level of access permission to the applications. An access request to access an application is received at the identity management system and responsive to the access request, a user associated with the access request is authenticated. Upon successful authentication, the user role associated with the authenticated user is determined and the user is allowed to access functions of the application corresponding to the determined user role.

20 Claims, 10 Drawing Sheets

*FIG. 7*

Company Users

[ Add a new user ]

List of Company Users

Search for Users: [_____] [ Go ]

Results 1-20 of 53     1 | 2 | 3 | Next ⊙

| User ID ▲ | First Name ⇕ 701 | Last Name ⇕ 703 | Role ⇕ 705 | Actions 707 |
|---|---|---|---|---|
| 583582VEMAD1 | AJAY | PAREKH | Administrator | Edit | Delete | Reset Password |
| 583582VEMAD2 | ajay | parekh | Administrator | Edit | Delete | Reset Password |
| CEBQCVAXGROUPAD | Sharon AD | Kelly | Administrator | Edit | Delete | Reset Password |

*FIG. 8*

Edit Company User

*Indicates required field

① Edit Company User

First Name*

Last Name*

Phone Number

Email Address* ⟨?⟩

Role*   [Administrator ▾]   Need help finding a role?

User ID*

Password*   [••••••]   Password must contain at least 8 characters, including an uppercase letter, a lowercase letter, and a number.

Confirm Password*   [••••••]

Access Rights ⟨?⟩

↗ 801

☐ Bill on Behalf Of
☐ Microsoft Office 365(Limited Access) Learn More
☐ Name ID Services
☐ Network Extender
☐ Push To Talk
☐ Voice Cypher Software Access Rights ⟨?⟩

FIG. 9

What can each User Role do within My Business Account?                                         Close ⓧ

Administrator- Users have access to the complete menu structure. Note -there can be multiple administrators.

Analyst- Users have access to the complete menu structure, but cannot create or edit users, assign users to billing accounts, mobile device numbers or company structures or create or modify company structures.

Buy- Users have access to the Overview page which contains a link to the purchasing option.

Maintain- Users have access to all menu options, except for the Administration menu. Payments sub-menu.

Maintain and Pay- Users have access to all menu options, except for the Administration menu.

Maintain Limited- Users have access to all menu options, except for the Administration menu, and maintenance items that may incur additional costs. Transactions such as ordering service and/or devices, price plan changes, and feature changes are prohibited with this role.

Product & Service- Users have access to products and services they have been granted access to for online management.

Reporting- Users have access to all menu options, except for the Administration, Payments, and Account Maintenance. These users will receive a monthly email when all bills have been loaded in the application.

View Only- Users have view-only access.

View and Pay- Users have view-only and payment capabilities.

Maintain Service Plus- Users have access to non-revenue impacting maintenance transaction, BAM and reporting transactions, and with defined access to revenue transactions.

Maintain Service Business- Users have access to defined Account Maintenance transactions, selected reports, and Custom Applications.

| Menu Tab or DropDown | Administrator | Analyst | Buy | Maintain | Maintain and Pay | Maintain Limited | Product & Service | Reporting | View Only | View and Pay | Maintain Service Plus | Maintain Service Business |
|---|---|---|---|---|---|---|---|---|---|---|---|---|
| Main Overview | ⊙ | ⊙ | ⊙ | ⊙ | ⊙ | ⊙ | ⊙ | ⊙ | | | ⊙ | ⊙ |
| Account Maintenance | ⊙ | ⊙ | ⊙ | ⊙ | ⊙ | ⊙ | ⊙ | | | | ⊙ | ⊙ |
| Orders | ⊙ | ⊙ | | ⊙ | ⊙ | ⊙ | | ⊙ | ⊙ | | ⊙ | |
| Billing | ⊙ | ⊙ | ⊙ | ⊙ | ⊙ | ⊙ | | ⊙ | ⊙ | ⊙ | ⊙ | |
| Reports | ⊙ | ⊙ | ⊙ | ⊙ | ⊙ | ⊙ | ⊙ | ⊙ | ⊙ | | ⊙ | ⊙ |
| Support | ⊙ | ⊙ | ⊙ | ⊙ | ⊙ | ⊙ | ⊙ | ⊙ | ⊙ | ⊙ | ⊙ | ⊙ |
| Settings | ⊙ | ⊙ | | ⊙ | ⊙ | ⊙ | | ⊙ | ⊙ | | ⊙ | ⊙ |
| Utilities | ⊙ | ⊙ | | ⊙ | ⊙ | ⊙ | | ⊙ | ⊙ | | ⊙ | ⊙ |

(-) Feedback

❷ Assign User

Structure [Billing Structure ⌄]

Filter [      ] [Go]  Filter Clears Selections

Please select the Folder, Account, and or Wireless number(s) you would like this user to have access to.

Check to Add

☐ 📁 Access to Entire Profile (24/24)
  ☐ 📁 242039050-00001
  ☐ 📁 242040290-00001
  ☐ 📁 342042905-00001

↑
1001

Assigned Billing Accounts

Check to Remove

☐ 📁 Access to Entire Profile

IDENTITY MANAGEMENT, AUTHORIZATION AND ENTITLEMENT FRAMEWORK

BACKGROUND

In recent years, various systems for managing users' identity for access to various software applications have been developed. The identity management systems manage individual principals and their authentication, authorization and privileges within or across computing systems and enterprise boundaries. In addition to controlling user information on computer systems and providing increased security and productivity, the identity management systems manage access to software applications, hardware and network resources.

Some known identity management systems provide a Single Sign-On (SSO) property that enables users of a system such as, for example, a software system, to log into the system once and gain access to all of the components of the system without having to log in and being authenticated at each component. Known identity management systems provide log-in controlled interfaces in order to prevent unauthorized entities from accessing the application system and direct the authorized users to the specific applications they are authorized to access. These known access control systems, however, do not provide control of various user roles and entitlements within each application, which may be different in different applications. Therefore, a need exists for an identity management system to control users' access rights within multiple applications in one place without the need for updates to every single application.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 7-10 are exemplary screenshots provided by the identity management platform shown in FIG. 2.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As the number of software applications provided by enterprises to their users increase, management of users' identity and access control across the applications become more challenging. Even within a single application, various components of the application may have different requirements and may need different access authorizations and entitlements for different users. In addition, the requirements may change over time due to changes in policies, services provided, and so on. As a result the task of managing users' identity, authorization and entitlements for multiple applications within a system becomes a complex and time and resource consuming task.

In one implementation, an identity management platform is provided that manages users' access to various applications while the applications are agnostic toward how the access control is implemented. In some instances the identity management platform may hide objects and icons associated with unauthorized functions from the display monitor used by a user to access the application. The identity management platform my replace the unauthorized functions with other authorized and accessible functions for the user. In other instances, the identity management platform may deactivate an unauthorized function such that once selected by the user, the function does not perform the function's intended task.

Figure 1:
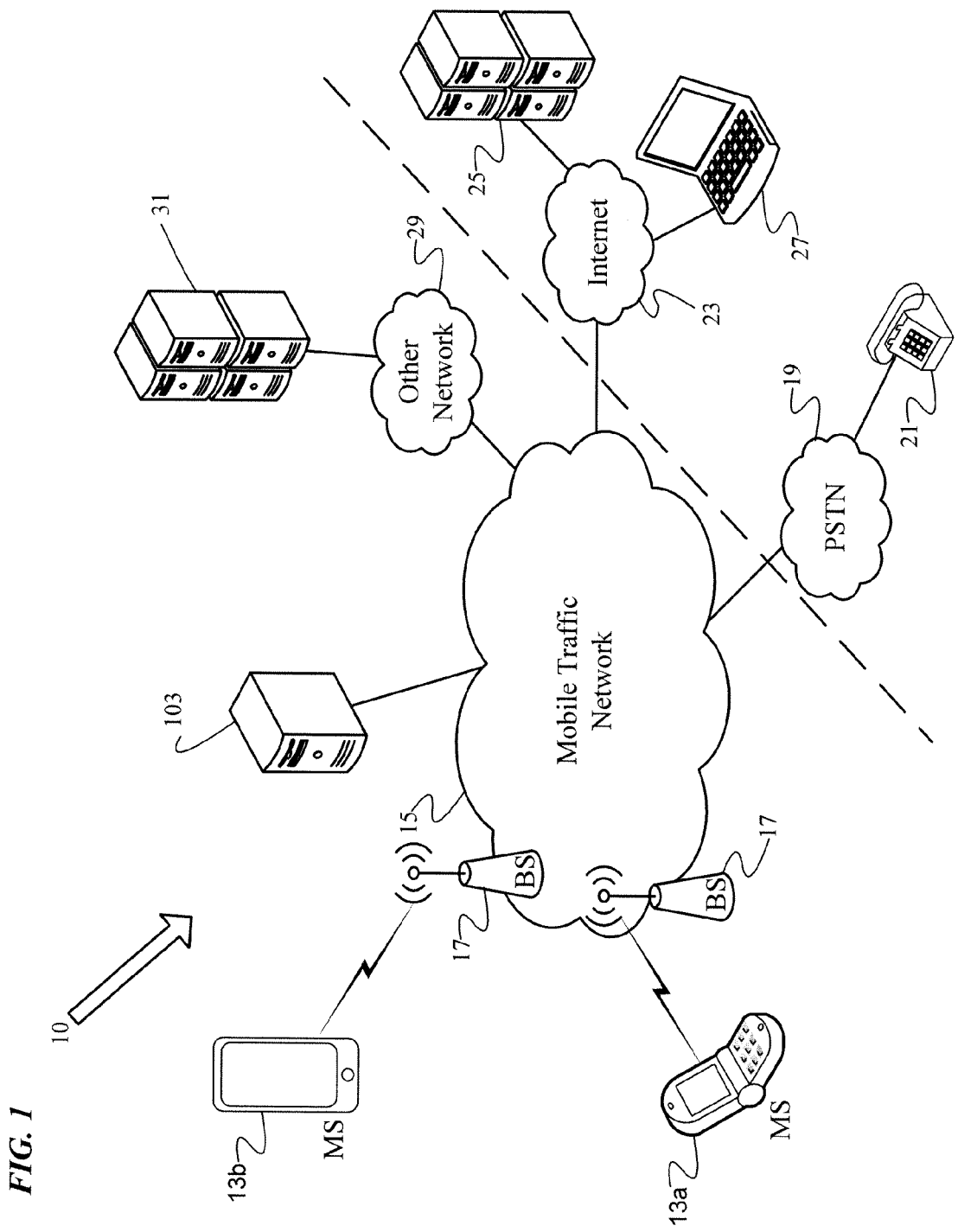
FIG. 1 is a high-level functional block diagram of an exemplary network that provides various communications for mobile stations and supports an example of the identity management service according to one implementation.

Reference now is made in detail to the examples illustrated in the accompanying drawings and discussed below. FIG. 1 is a high-level functional block diagram of an exemplary network that provides various communications for mobile stations and supports an example of the identity management service according to one implementation. FIG. 1 illustrates a system 10 offering a variety of mobile communication services, including communications for identity management by an identity management platform 103. The identity management platform 103 can provide identity management to applications provided by the application servers 31 and 25 to the mobile stations 13a and 13b and the user terminals 27. The example shows simply two mobile stations (MSs) 13a and 13b as well as a mobile communication network 15. The stations 13a and 13b are examples of mobile stations that may be used for accessing various applications provided by the application servers 31 or 25 and their access to the applications are managed by the identity management platform 103. However, the network will provide similar communications for many other similar users as well as for mobile devices/users that may not participate in the identity management service. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13a and 13b may be capable of voice telephone communications through the network 15, and for accessing applications managed by the identity management platform 103. The exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13a and 13b via the Internet 23 may be with devices like those shown at 25 and 27 as well as with a variety of other types of devices or systems capable of data communications through various interconnected networks. The mobile stations 13a and 13b of users also can receive and execute applications written in various programming languages, as discussed in more detail below.

Mobile stations 13a and 13b can take the form of portable handsets, smart-phones or personal digital assistants, although they may be implemented in other form factors. Program applications, provided by the internet server 25 or the application server 31 to the mobile stations 13a, 13b and computing devices 27 can be configured to execute on many different types of mobile stations 13. For example, a mobile station application can be written to execute on a binary runtime environment for mobile (BREW-based) mobile station, a Windows Mobile based mobile station, Android, IPhone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13a and 13b, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13a and 13b, when the mobile stations are within range. Each base station can include a BTS coupled to several antennae mounted on a radio tower within a coverage area often referred to as a "cell." The BTS is the part of the radio network that sends and receives RF signals to/from the mobile stations 13a and 13b that are served by the base station 17.

The radio access networks can also include a traffic network represented generally by the cloud at 15, which carries the user communications and data for the mobile stations 13a and 13b between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31.

A mobile station 13a or 13b communicates over the air with a base station 17 and through the traffic network 15 for various voice and data communications, e.g. through the Internet 23 with a server 25 and/or with application servers 31. To insure that the application service offered by application servers 25 or 31 is available to only authorized devices/users, the provider of the application service may also deploy an identity management service by an identity management platform 103. The identity management platform 103 can provide identity management to applications provided by the application servers 31 and 25 to the mobile stations 13a and 13b and the user terminals 27. The identity management platform 103 could be a separate physical server as shown, or identity management platform 103 could be implemented as another program module running on the same hardware platform as the application server 31 or 25. Essentially, when the application server (server 31 in our example) receives a service request from a client application on a mobile station 13a or 13b or a user terminal 27, the application server provides appropriate information to the identity management platform 103 to allow the identity management platform 103 the mobile station 13a or 13b or user terminal 27 as outlined herein. Upon successful authentication, the identity management platform 103 informs the application server 31 or 25, which in turn provides access to the service via data communication through the various communication elements (e.g. 29, 15 and 17) of the network 10. The identity management function provided by the identity management platform 103 may be provided via the server 25, if there is an appropriate arrangement between the carrier and the operator of server 25, by a program on the server 25 or via a separate authentication server (not shown) connected to the Internet 23.

Servers such as 25 and 31 may provide any of a variety of common application or service functions in support of or in addition to an application program running on the mobile station 13a, 13b, or a user terminal 27. However, for purposes of further discussion, we will focus on functions thereof in support of the mobile identity management service. For a given service, including the identity management service, an application program within the mobile station may be considered as a 'client' and the programming at 103, 25 or 31 may be considered as the 'server' application for the particular service.

Figure 2:
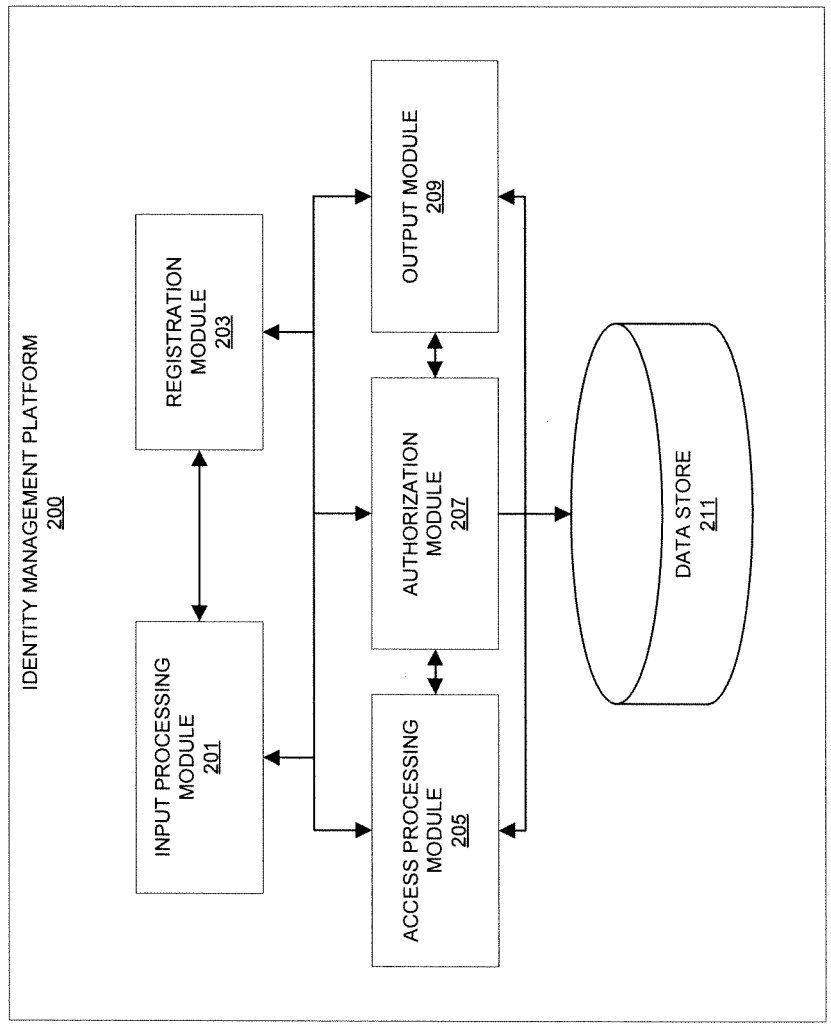
FIG. 2 is a schematic illustration of an identity management platform, according to an implementation.

FIG. 2 is a schematic illustration of an identity management platform, according to an implementation. The identity management platform 200 can be similar to the identity management platform 103 of FIG. 1. As shown in FIG. 2, an identity management platform 200 can include an input processing module 201, a registration module 203, an access processing module 205, an authorization module 207, an output module 209, and a data store 211. As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The identity management platform 200 can provide identity management to applications provided by the application servers 31 and 25 to the mobile stations 13a and 13b and the user terminals 27. In some instances, the input processing module 201 receives a request from an application server 31 or 25 to register one or more applications provided by the application servers 31 and 25 at the identity management platform 200. In such instances, the input module 201 can send the request to the registration module 203 to register the one or more applications provided by the application servers 31 or 25 at the identity management platform 200. Each application may have a different level of access permission based on a user role associated with a user accessing the application. For example, the registration module 203 may register an application based on a request from a mobile station 13a-13b, a user terminal 27, or an application server 31 or 25 to register one or more applications. The request may include a set of allowed roles associated with the application. The allowed roles for example may define rights for various users such as, for example, and end user, system administrator, software developer, etc. when using the application. The registration request may be received by the input processing module 201 and sent by the input processing module 201 to the registration module 203 to be processed. The registration module 203 may store the application registration information in data store 211.

In some instances, the allowed roles associated with an application that are assigned to categories of users or individual users may include permissions provided to the users to access functions provided by the application or activate operations provided by the application. For example, functions provided by an application may include filling up form fields, submitting data, or opening menu items, links or images. Moreover, operations provided by an application may include, for example, reading, inserting, updating, or deleting data. The set of functions, operations and services provided by an application may be referred to as "assets".

In some instances, the input processing module 201 receives a set of user profiles associated with a group of users. Each user profile includes a login credential for allowing a user to access at least one of the applications and a user role for defining a user level of access permission to the at least one application. The input processing module 201 may receive the user profiles from the application server 31 or 25 or from other user registration entities communicating with the identity management platform 200. The input processing module 201 may store the user profiles in data store 211. At this point, the data store 211 includes login credentials for the users and their corresponding permission access roles to various applications.

In some instances the access processing module 205 receives an access request to an application. The access request may be received directly from the user using the mobile stations 13a or 13b or it may be received from the server hosting the application (e.g., server 31 or 25). The access request may identify the application and may include the login credentials of the user for accessing the application. If the access request does not include the login credentials, the access processing module 205 may solicit the login credentials from the entity (e.g., the user or the server hosting the application) in response to the access request. The login credentials may include a username and password for accessing the application.

Responsive to the access request and upon receiving the login credentials, the authorization module 207 authenticates user associated with the access request by comparing login credential received from the user with the login credential stored in the user profile associated with the user. If the login credentials match and the user is successfully authenticated, the access processing module 205 determines the role associated with the authenticated user based on the user profile of the user.

In some instances, a user may be assigned several roles for accessing several applications, one role associated with each application. In such instances, the user may have a different user profile and a different set of login credentials (e.g., user name and password) for each application. In other instances, for example when multiple applications are provided by the same application server 31 or 25, the user may be associated with one user profile and one set of login credentials for all the applications provided by the same application server. However, the user profile may associate a different role with the user for each application. For example, the user profile may include a roles table where each row includes an application and a user role for that application.

In other instances, a user may have multiple profiles and multiple login credentials, where accessing various applications would require the user to login with the login credentials specifically defined for that application. In addition, a user may be allowed to access an application with multiple roles. In such instances, each role may be tied to a different login credential for the user in the user profile.

In some instance, when a user logs into an application A with one login credential, the identity management platform 200 may automatically log the user into one or more other applications B, or C, if there is a predefined link between the login credentials associated with the user in the user profile for applications A, B, and C, or if the user has one set of login credentials for all applications A, B, or C. In such instances, the access processing module 205, upon receiving an access request to an application A, B, or C from the user, may send a request to the authorization module 207 for verifying the user roles. The access processing module 205 allows user access to the application based on the verification results received from the authorization module 207. In some exemplary instances, the automatic logging of the user into applications A, B, and C by the identity management platform 200 may result in an automatic start of all the applications A, B, and C such that the applications open on a user interface of the mobile station 13a or 13b or a user terminal 27 of the user. In some other exemplary instances, the automatic logging may not result in automatic start of the application; however when an application A, B, or C is started by the user subsequent to the initial login by the user, the application can be opened on the user interface without the user being prompted to insert his/her credentials. The automatic opening of applications may be determined based on a setup predefined in the user profile by the user or as a default set by the identity management platform 200 or by an application server 31 or 25.

In some instances, the identity management platform 200 can send user login credentials and roles to an active application, for example upon receiving a request from the active application. In such instances, a configuration of the active application can be modified based on the role of the user and therefore, an access request to the application from the user can be directly sent to the application without being verified by the identity management platform 200, until a change in user credential occurs. In such instances, the application can verify user identity before allowing the user to access secure assets (e.g., functions) protected by user roles. Upon any change in user credentials, the identity management platform 200 can send the updated login credentials to the active application to replace the old login credentials. Alternatively, in other instances, the application may seek permission from the identity management platform 200 each time access to a secure element (e.g., a function that is not available to all users) is requested by a user, to see if the user has the permission to access the secure element.

Upon authentication of the user by the authorization module 207 and determination of the user roles by the access processing module 205, the determined user roles can be stored in data store 211. At this point, the output module 209 can direct the user to use the application. The user may work with the application without noticing any sign or footprint of the identity management process by the identity management platform 200, however, in fact the user is working with the application based on the user's assigned role.

In some instances, the output module 209 may exclude one or more assets from the presented application for users who are not authorized to use those assets. For example, if the application has an "update bill" function, an icon or button representing the "update bill" function may be excluded from the application as presented to an end user. In this example, the user may be unaware of the additional assets available as they are not displayed. In some instances, the output module 209 may include the one or more functions in the presented application but deactivate the included one or more functions. For example, the "update bill" button may be included in the application interface as presented to an end user, but the related icon or button may be deactivated such that selecting the button by the end user does not activate the function, e.g., by "graying out" the button.

For example, part of the assets (e.g., functionalities) of the application may be deactivated for one user while other users may have access to the assets. In some instances, the output module 209 may notify the user, for example by displaying an error message, that the user is not allowed to access some assets of the application based on the determined user role. For example, the output module 209 may present the error message on a screen of the mobile station 13a or 13b or user terminal 27 of the user.

Figure 3:
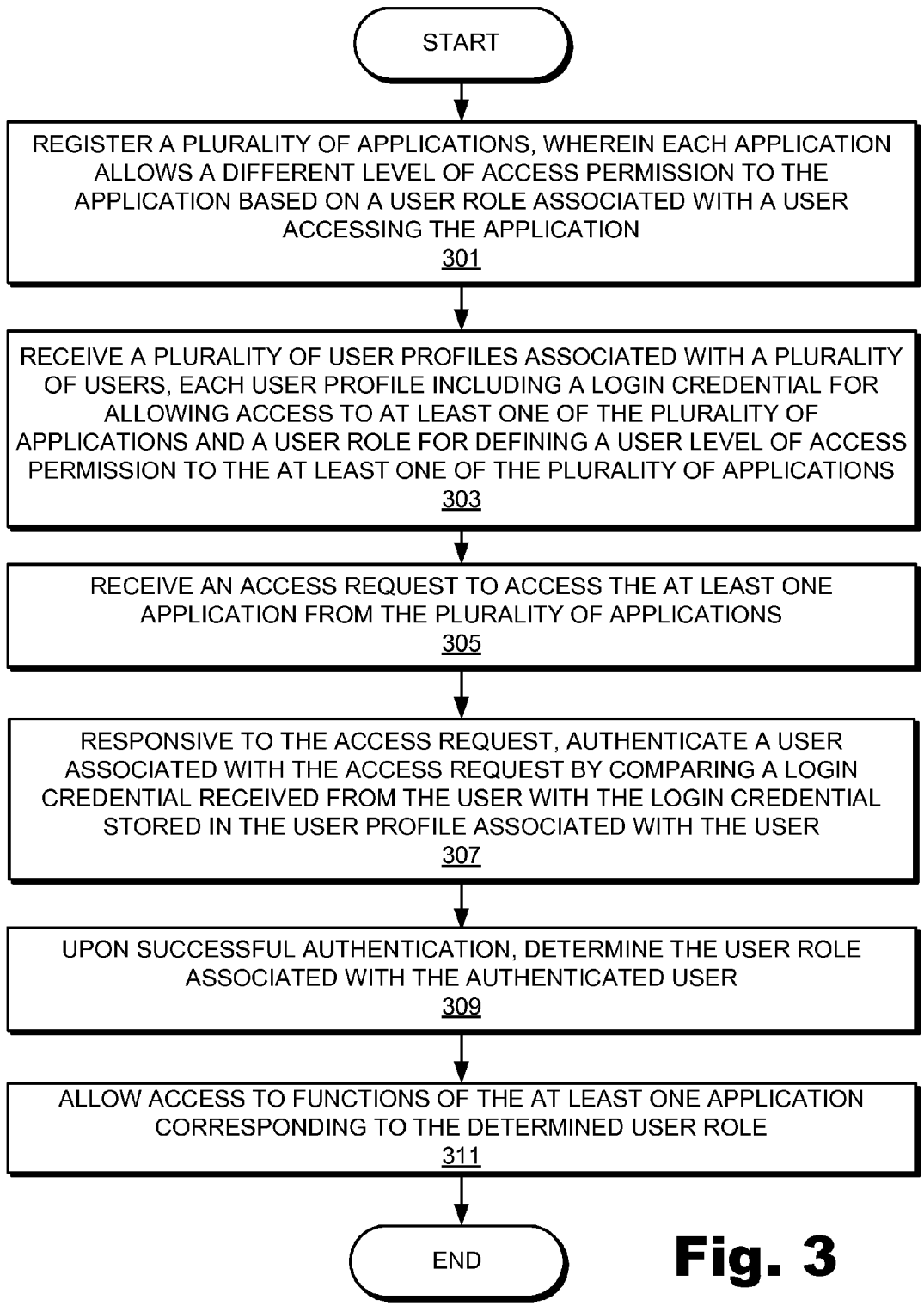
FIG. 3 is an exemplary process for providing identity management.

FIG. 3 is an exemplary process for providing identity management. Although FIG. 3 is described with reference to FIGS. 1 and 2, the subject technology is not limited to such and can apply to other computing devices and systems. At block 301, the registration module 203 of the identity management platform 200 registers a set of applications at the identity management platform 200 (103 in FIG. 1). Prior to the registration, the input module 201 may receive applications information from the application servers 31 or 25. The information may include various user roles for accessing each application. Each application may allow a different level of access permission to each user from a set of users based on a user role associated with the user accessing the application. For example, the user roles may be associated by the application server 31 or 25. Each application has a set of allowed roles, where the set of allowed roles determine various levels of access allowed to the application. A user can access and work with the application via a mobile station 13a or 13b or a user terminal 27 as shown in FIG. 1. The application can be provided by an application server such as servers 31 or 25 that communicate with the mobile stations 13a and 13b and the user terminal 27 via the mobile traffic network 15, other networks 29, or Internet 23 of FIG. 1. The set of allowed roles associated with an application may determine user entitlement for accessing assets that are provided by the application. The registration module 203 can receive application information including the user roles associated with each application from the input processing module 201. Alternatively, the input processing module 201 may store the information in data store 211 and the registration module 203 can retrieve the information from the data store 211.

At block 303, the input processing module 201 receives a set of user profiles associated with a group of users, for example, from an application server 31 or 25. Each user profile includes a login credential for allowing access to at least one of the applications provided by the application server 31 or 25 and a user role for defining a user level of access permission to the at least one application. A user role associated with an application can identify assets (e.g., data, features, functions, etc.) of the application that the user is allowed to access and/or manipulate such as, for example, pages, fragments of pages, forms, fields of the forms, buttons, check boxes, drop-down menus, links, etc. The user role may also identify operations that a user is allowed to perform on data such as, for example, create new data items, read data, update data, delete data, approve data, etc. The user roles associated with each user in the user profile may also be stored in a data store.

In some instances, users may register with the application server 31 or 25 prior to having access to the applications provided by the servers. The users may also register with the identity management platform 200 (103 in FIG. 1). The user registration to the identity management platform 200 can be performed simultaneously with user registration at the application servers 31 or 25 or at a different time, for example, the first time the user tries to access an application. The identity management platform 200 may receive user registrations from the application servers 31 or 25 and store the registered user data in data store 211. The access processing module 205 can define the user profile based on the registration information of the user and the one or more roles from the set of roles of each application for that user. The access processing module 205 can store the user profiles in data store 211.

At block 305 the input processing module 201 receives and access request from a user via a mobile station 13a or 3b or a user terminal 27 associated with the user. The access request may include a request for accessing an application provided by an application server 31 or 25. Upon receiving the access request, the input processing module 201 can send the request to the authorization module 207 to authenticate the user and determine user access rights to the requested application.

At block 307 the authorization module 207 authenticating the user associated with the access request in response to the access request. The authorization module 207 may authenticate the user by comparing the login credential received from the user with the login credential stored in the user profile associated with the user in data store 211. The authorization module 207 may also request a user profile from the application server 31 or 25, for example, when a user profile does not exist in data store 211 for the requesting user or the user profile is outdated or has not been accessed for more than a predetermined duration. In various instances, the authorization module 207 can determine timeliness of the user profile based on a date associated with the user profile such as, for example, a date and time the profile was created or a latest date and time that the profile was accessed. The authorization module 207 may compare the creation date or the last access date of the user profile against a predefined threshold to determine the timeliness of the user profile. The predefined threshold may be defined by an application server 31 or 25 and may vary by application, by families of applications (e.g., versions of the same application), by user, by categories of users, etc.

In some instances, the user profile may include a set of credentials for multiple applications, in such instances, the authorization module 207 can simultaneously authenticate the user for accessing any of the applications included in the user profile. The authorization module 207 may store authorization data for a user for accessing an application in data store 211. In addition, the authorization module 207 may send the authorization data to the application server 31 or 25 to be stored at the application server.

If user authentication is successful and there is a match between the login credentials and the login credential stored in the user profile, at block 309 the access processing module 205 determines a user role associated with the authenticated user for accessing the application, access to which was requested by the user. In some instances, the set of allowed roles associated with an application can be an empty set. In such instances, the authorization module 207 may determine that every user is authorized to access every asset provided by the application.

At block 311 the access processing module 205 allows access to assets of the at least one application corresponding to the determined user role, for example, by presenting the application requested by the user on the mobile station 13a or 13b or on the user terminal 27 of the user based on the determined user authorization via the output module 209. For example, the output module 209 may act as an interface between the application as provided by the application server 31 or 25 and the mobile station 13a or 13b or the user terminal 27. In some exemplary instances, if one or more assets provided by the application are not included in the user role for that application, the access processing module 205 may exclude the one or more assets from the presented application to the user. In other instances, if one or more of assets provided by the application are not included in the user role for that application, the access processing module 205 may include the one or more assets in the presented application, but deactivate the included one or more assets, such that the user cannot activate the assets. In such instances, the user may see, for example, a button for a specific asset, however, when the user selects the button to activate the asset the output module 209 may provide an error message to the user via the mobile station 13a or 13b or the user terminal 27 indicating that the user does not have access rights to the assets. The error message may further indicate what class has the access rights to the asset and/or provide contact information for a user who has access rights to the asset. The user having access rights may be a default user (or set of users) for all users without access rights or may be dependent on the particular user or class of users without access rights.

In some instances, upon presenting the error message to the user, the input processing module 201 may receive an authorization request from the user via the mobile station 13a or 13b or the user terminal 27 for accessing the deactivated asset. In such instances, the input processing module 201 can send the request to the application server 31 or 25 and obtain an approval from the application server 31 or 25 for the user authorization. For example, the application server 31 or 25 may request verification of personal information from the user or verification of user rights from an administrator and approve user authorization based on the verifications, for example, by sending an approval message to the identity management platform 103. Subsequently, if the approval is obtained, the access processing module 205 can update the user profile to include a role associated with the deactivated asset. The authorization module 207 can update user authorization based on the new user profile and authenticate the user. In addition, the access processing module 205 may send the updated user profile to the application server 31 or 25 via the output module 209 such that the application server can update the user profile for further reference. Alternatively, the application server 31 or 25 can modify the user profile, upon receiving the request, and send the updated user profile to the identity management platform 200 to be stored in data store 211.

In some instances, the registration module 203 may receive a request from an application server 31 or 25 to register a new application. The request may include a set of roles associated with the new application. In such instances, the access processing module 205 can update, for each user, the user profile such that the user profile includes a login credential for allowing access to the new application and one or more user roles from the set of roles of the new application for defining a user level of access permission to the new application for that user.

In some instances, the application server 25 or 31 or the identity management platform 200 can define categories of users such as, for example, end user, administrator, manager, financial officer, help desk staff, etc. In such instances, the one or more roles included in each user profile can be pre-determined based on a user category. For example, a financial officer may always be given access authorization to a billing function while the help desk staff may not have the authorization to access financial functions provided by the application. In addition, in such instances, when a user role of the user category that a user belongs to is updated (for example, by an application server 31 or 25), the access processing module 405 can update the user profile to include the updated user role associated with the user category.

In some instances, a user of a mobile station 13a, 13b, or a user terminal 27 may be given multiple access roles by an application. For example, the user may have access rights to the application assets as an end user and an administrator. In such instances, the user profile can be updated to include combined roles of an end user and an administrator. The user may be assigned multiple login credentials, one for each role. In addition, new user categories may be defined based on various combinations of roles associated with multiple applications.

In various instances, the user roles and access information to various applications may be stored in a local storage at the mobile station 13a or 13b or the user terminal 27, at a remote location (e.g., on the cloud accessible to the user via the mobile traffic network 15), at the application server 31 or 25, or at the data store 211 of the identity management platform 200.

Figure 4:
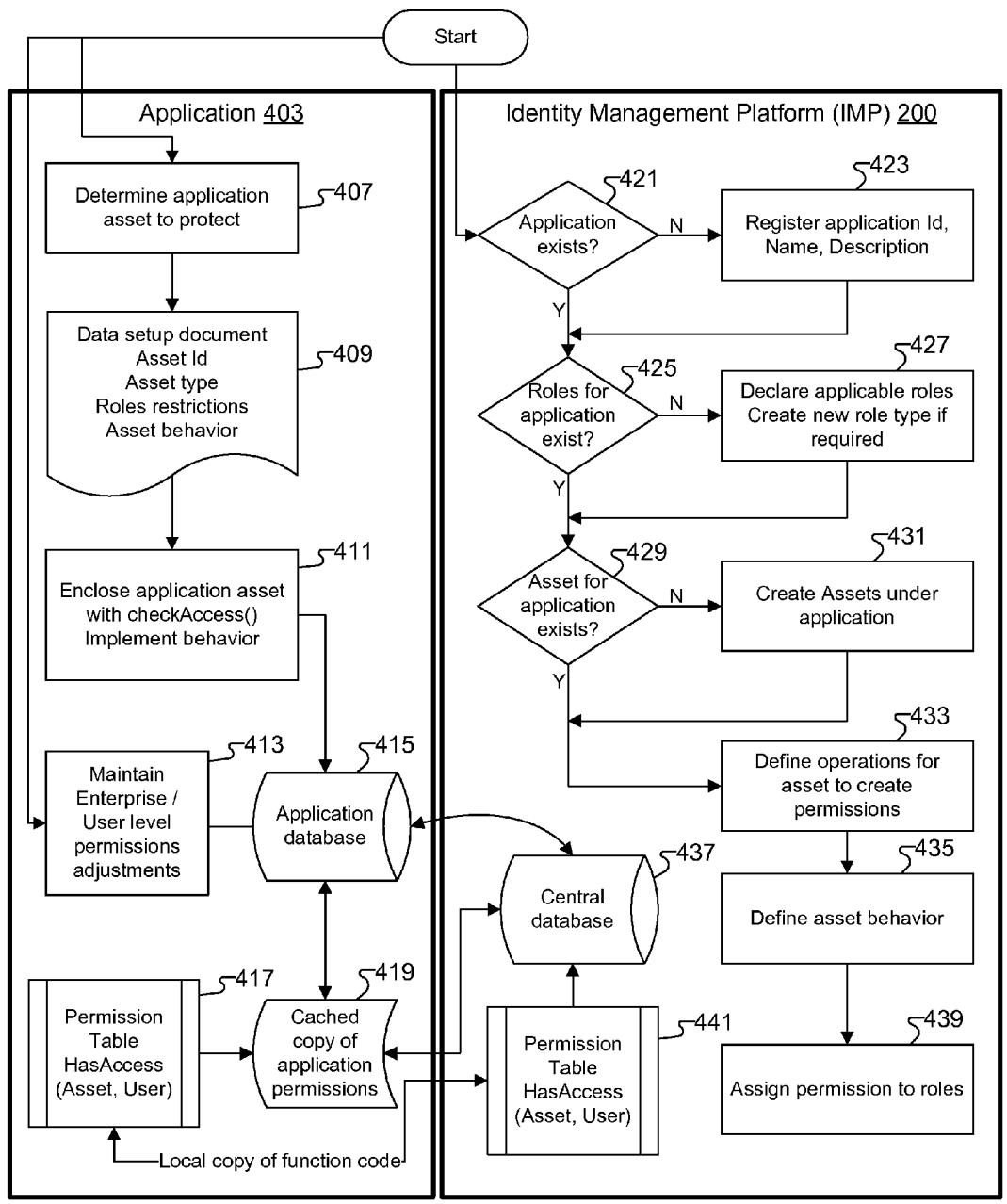
FIG. 4 is another exemplary process for providing identity management.

FIG. 4 is another exemplary process for providing identity management. In some instances, as seen in step 407 the identity management platform 200 (as shown in FIG. 2) determines assets (e.g., functions, features, etc.) of an application 403 that need to be protected. The input processing module 201 of the identity management platform 200 may receive asset data related to the assets from an application server 31 or 25 (shown in FIG. 1). As previously discussed with regards to FIG. 3 application assets may include pages, fragments of pages, forms, fields of the forms, buttons, check boxes, drop-down menus, links, data, etc.

At step 409, the identity management platform 200 analyzes the data related to assets such as, for example, asset ID, asset type, user roles associated with the asset, asset behavior (e.g., response to access). The analysis may be performed, for example, by the input processing module 201. The input processing module 201 can store the asset data in data store 211.

At step 411, the access processing module 205 encloses application assets with specific check points that may be activated whenever a user tries to access the asset, for example by selecting a button or clicking on a link provided by the application. And at step 413 the access processing module 205 associates permissions for accessing the application assets to various users based on the roles defined for the users in user profiles. As seen in step 417 a permission may be a tuple (Asset, User) indicating that the "User" is permitted to access the "Asset". The access processing module 205 may store the application data 415 and the permission data 419 in data store 211.

At step 421, upon receiving an access request from a user, the input processing module 201 checks whether the requested application has been registered at the identity management platform 200. If the application is not registered, at step 423 the registration module 203 registers the application at the identity management platform 200, as previously discussed above in relation to FIGS. 2. Upon registration or upon determining that the application has been previously registered, at step 425 the access processing module 205 checks whether there are roles associated with the application. The access processing module 205 may search the application database 415 or cache 419 (e.g., in data store 211) to determine application roles. If the roles do not exist, for example the application has been newly registered, at step 427 new roles are associated with the application. The new roles may be associated with the application based on the application data 415 received from the application server 31 or 25. In some instances, if the access processing module 205 determined at step 425 that the roles exist, the access processing module 205 may determine that the roles are outdated (e.g., a pre-determined period of time is passed since the last times the roles were updated). In such instances, the access processing module 205 may declare roles by creating new roles or assigning roles to the application per step 427. The roles for an application may be defined based on roles previously defined for similar applications (e.g., applications in the same family, applications with similar usage, etc.)

Upon determination that application roles exist or new roles are created, in step 429 the access processing module 205 checks whether there are assets associated with the application. The access processing module 205 may search the application database 415 or cache 419 (e.g., in data store 211) to determine application assets. If the assets do not exist, for example the application has been newly registered, at step 431 new assets are associated with the application. The new assets may be associated with the application based on the application data 415 received from the application server 31 or 25. In some instances, if the access processing module 205 determined at step 429 that the assets exist, the access processing module 205 may determine that the assets are outdated (e.g., a pre-determined period of time is passed since the last times the assets were updated). In such instances, the access processing module 205 may create new assets per step 431.

Upon determination of the assets, in step 433 the access processing module 205 defines operations on the assets (e.g., insert data, delete data, modify data, etc.) and permissions to apply to each operation. At step 435, the access processing module 205 defines various behaviors of the application with regards to the assets. The behaviors may indicate functions associated with each asset. The permissions can be associated with the application roles at step 439. The data related to operations, permissions and asset behaviors may be retrieved from the application database 415 or cache 419 based on the data provided by the application server 31 or 25. Note that at any step of the process the output of the step such as, for example, roles, assets, operations, permissions, asset behaviors, etc. can be stored in cache 419, central database 437 or in any other storage location of the data store 211. Furthermore, the application database 415 and the central database 437 can be regularly synchronized to have up to date data. In addition the permission table 441 is similar to the permission table 417 accessible by application 403 and by the identity management platform 200 and its components.

The identity management service provided is substantially different from the Single Sign-On (SSO) properties of some known identity management systems. The known SSO services enable users of a system such as, for example, a software system, to log into the system once and gain access to all of the components of the system without having to log in and being authenticated at each component. The known services, however, do not provide control of various user roles and entitlements within each application, which may be different in different applications, as provided by the identity management platform 200 described. The identity management platform 200, as discussed, enables users to assume various roles when using same or different applications. In addition, the identity management platform, 200 can associate various rights and services available to different users within the same application.

The identity management service under consideration here may be provided to users of touch screen type mobile stations as well as to non-touch type mobile stations. Hence, our simple example shows the mobile station (MS) 13a as a non-touch type mobile station and shows the mobile station (MS) 13b as a touch screen type mobile station. Implementation of the on-line identity management service may involve some execution of programming in the mobile stations as well as implementation of user input/output functions and data communications through the network 15, from the mobile stations.

Those skilled in the art presumably are familiar with the structure, programming and operations of the various types of mobile stations. However, for completeness, it may be useful to consider the functional elements/aspects of two exemplary mobile stations 13a and 13b, at a high-level.

Figure 5:
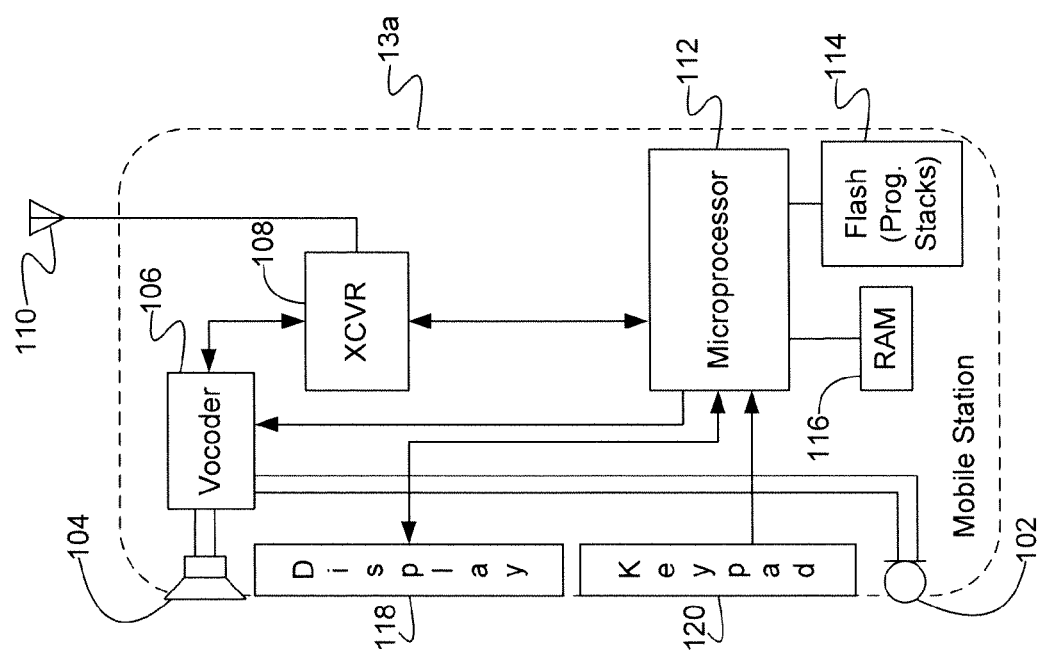
FIG. 5 is a high-level functional block diagram of an exemplary non-touch type mobile station that may utilize the identity management service through a network/system like that shown in FIG. 1.

For purposes of such a discussion, FIG. 5 provides a high-level functional block diagram of an exemplary non-touch type mobile station that may utilize the identity management service through a network/system like that shown in FIG. 1. FIG. 5 provides a block diagram illustration of an exemplary non-touch type mobile station 13a. Although the mobile station 13a may be a smart-phone or may be incorporated into another device, such as a personal digital assistant (PDA) or the like, for discussion purposes, the illustration shows the mobile station 13a is in the form of a handset. The handset implementation of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass implementations of the mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like; call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during identity management process. For example, the user interface elements may be used for registration at an identity management platform 103 or requesting the identity management platform for authentication or access authorization to applications.

A microprocessor 112 serves as a programmable controller for the mobile station 13a, in that it controls all operations of the mobile station 13a in accord with programming that it executes, for all normal operations, and for operations involved in the identity management procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for providing identity management.

Figure 6:
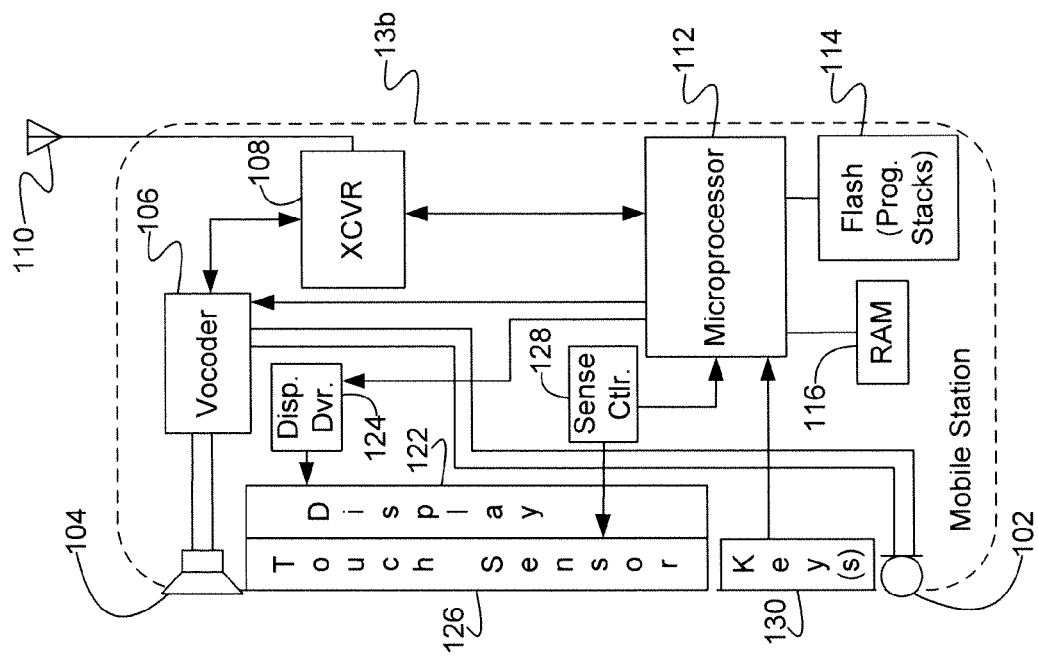
FIG. 6 is a high-level functional block diagram of an exemplary touch screen type mobile station that may utilize the identity management service through a network/system like that shown in FIG. 1.

For purposes of such a discussion, FIG. 6 provides a high-level functional block diagram of an exemplary touch screen type mobile station that may utilize the identity management service through a network/system like that shown in FIG. 1. FIG. 6 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 6. For example, the touch screen type mobile station 13b includes a microphone 102, speaker 104 and vocoder 106, for audio input and output functions, much like in the earlier example. The mobile station 13b also includes at least one digital transceiver (XCVR) 108, for digital wireless communications, although the handset 13b may include an additional digital or analog transceiver. The concepts discussed here encompass implementations of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the identity management procedure under consideration here. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming stored in the flash memory 114 configures the processor so that the mobile station is capable of performing various desired functions, including in this case the functions involved in the technique for providing identity management.

In the example of FIG. 5, the user interface elements included a display and a keypad. The mobile station 13*b* may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13*b* includes a display 122, which the microprocessor 112 controls via a display driver 124, to present visible outputs to the device user. The mobile station 13*b* also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13*b*. The microphone 102 and speaker 104 may be used as additional user interface elements, for audio input and output, including with respect to some identity management related functions.

The structure and operation of the mobile stations 13*a* and 13*b*, as outlined above, were described by way of example, only. As shown by the above discussion, functions relating to the identity management service, via a graphical user interface of a mobile station may be implemented on computers connected for data communication via the components of a packet data network, operating as shown in FIG. 1. Although special purpose devices may be used, such devices also may be implemented using one or more hardware platforms intended to represent a general class of data processing device commonly used to run "server" programming so as to implement the identity management functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for identity management. The software code is executable by the general-purpose computer that functions as the identity management platform and/or that functions as a user terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for identity management, in essentially the manner performed in the implementations discussed and illustrated herein.

FIGS. 7-10 are exemplary screenshots provided by the identity management platform 200 shown in FIG. 2. FIG. 7 depicts a list of users registered by the registration module 203. The list includes user first name 701, last name 703, role 705, and actions 707 that represent functions that the user is entitled to perform. FIG. 8 shows a display allowing modification of a user profile by the registration module 203. The list 801 provides options for enabling and/or disabling the user access rights to various functions, for example by an administrator. FIG. 9 displays a table 901 that allows an administrator to assign various access rights to each role. Each row in table 901 represent a function and each column represents a role. A check mark in a row and column junction indicates that the role of the column is assigned access to the function of the row.

FIG. 10 shows assigning specific levels of access depth to a user. For example, a user may have access to certain services provided by an application server 31 or 25. The screen on FIG. 10 enables an administrator to control the services assigned to a user. For example, a user may be entitled to access accounting services but not the products services. The list 1001 enables an administrator to select services accessible by a specific user.

Figures 11, 12:
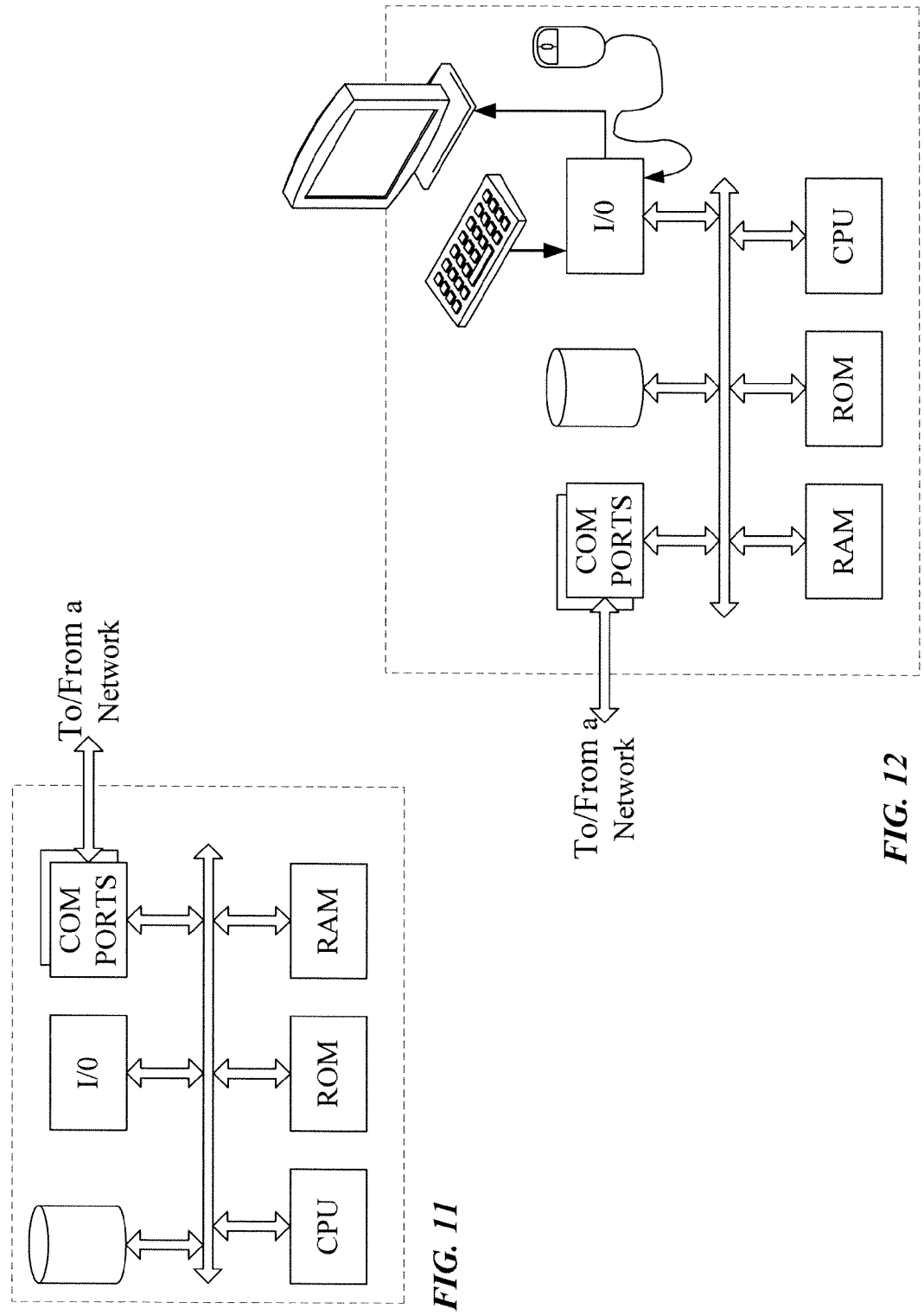
FIG. 11 is a simplified functional block diagram of an exemplary computer that may be configured as a host or server.
FIG. 12 is a simplified functional block diagram of an exemplary personal computer or terminal device.

FIGS. 11 and 12 provide functional block diagram illustrations of general purpose computer hardware platforms. FIG. 11 illustrates a network or host computer platform, as may typically be used to implement a server. FIG. 12 depicts a computer with user interface elements, as may be used to implement a personal computer or other type of work station or terminal device, although the computer of FIG. 12 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 11). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of providing identity management outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the identity management platform 103 into the computer platform of the application server 25 that will be the application server for the mobile stations 13a, and 13b or the user terminal 27. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the identity management, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

Many of the above described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions.

In this specification, the term "software" is meant to include firmware residing in read-only memory or applications stored in magnetic storage, which can be read into memory for processing by a processor. Also, in some implementations, multiple software operations can be implemented as sub-parts of a larger program while remaining distinct software operations. In some implementations, multiple software operations can also be implemented as separate programs. Finally, any combination of separate programs that together implement a software invention described herein is within the scope of the invention. In some implementations, the software programs, when installed to operate on one or more electronic systems, define one or more specific machine implementations that execute and perform the operations of the software programs.

A computer program (also known as a program, software, software application, script, application, or code) can be written in any form of programming language, including compiled or interpreted language, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed herein is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The implementations described hereinabove are further intended to explain and enable others skilled in the art to utilize the invention in such, or other, implementations and with the various modifications required by the particular applications or uses of the invention. Accordingly, the description is not intended to limit the invention to the form disclosed herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A method comprising:
   registering, at an identity management system, a plurality of applications, wherein each respective application in the plurality of applications has multiple levels of access permission and allows a different level of access permission from the multiple levels of access permission to the respective application in the plurality of applications based on a user role associated with a user accessing the respective application;
   receiving, at the identity management system, a user profile associated with a user, the user profile including
      an established login credential associated with the user and stored in the user profile for allowing access to at least a first application and a second application of the plurality of applications,
      a user role associated with the user for defining a user level of access permission to the first application and to the second application, and
      an indication that the second application is to be automatically started and authentication upon successful authentication of the user to access the first application;
   receiving, at the identity management system, an access request for the user to access the first application;
   responsive to the access request, authenticating the user to access the first application by comparing a submitted login credential received from the user with the established login credential associated with the user and stored in the user profile;
   upon successful authentication of the user to access the first application, determining the user role associated with the user;
   upon successful authentication of the user to access the first application and based upon the indication that the second application is to be automatically started and authenticated upon successful authentication of the user to access the first application, automatically starting the second application and authenticating the user to access the second application; and
   allowing access to functions of the first application and to functions of the second application corresponding to the determined user role.

2. The method of claim 1, wherein registering the plurality of applications includes registering a plurality of user roles for each respective application in the plurality of applications, each respective user role in the plurality of user roles identifying user entitlement to access specific functions provided by the respective application.

3. The method of claim 2, wherein:
   the plurality of user roles includes a first role and a second role,
   the first role provides access to a first set of functions of the respective application,
   the second role provides access to a second set of functions of the respective application, and
   the first set of functions excludes certain functions included in the second set of functions.

4. The method of claim 3, wherein when access permission based on the first role is granted to the user, the excluded functions are visible to the user and deactivated.

5. The method of claim 4, wherein when the user granted access permission based on the first role selects the one or more excluded functions, an error message is provided to the user indicating that the user does not have access rights to the one or more excluded functions, the method further comprising:
   receiving an authorization request from the user for accessing the one or more excluded functions;
   obtaining an approval for the authorization request; and updating the user profile to include a role associated with the one or more excluded functions in response to the approval being obtained.

6. The method of claim 1, further comprising:
receiving, at the identity management system, a request to register a new application; and
updating, for the user, the user profile such that the user profile includes an established login credential associated with the user and stored in the user profile for allowing access to the new application, a user role associated with the user for defining a user level of access permission to the new application, and an indication that the new application is to be automatically started and authenticated upon successful authentication of the user to access the first application.

7. The method of claim 1, wherein the user profile includes a plurality of user roles associated with the user for defining multiple levels of access permission to the first application and a plurality of user roles associated with the user for defining multiple levels of access permission to the second application.

8. The method of claim 1, wherein the user profile includes two or more user roles associated with the user for accessing an application from the plurality of applications.

9. The method of claim 1, wherein authenticating the user includes simultaneous authentication of the user for access to the first application and the second application based on the indication in the user profile.

10. The method of claim 1, wherein the user role is pre-determined based on a user category associated with the user, the method further comprising:
updating the user profile to include an updated user category, when the user role pre-determined based on the user category is updated.

11. An identity management system comprising:
a processing device; and
a memory storing executable instructions for causing the processing device to:
register, at an identity management system, a plurality of applications, wherein each respective application in the plurality of applications has multiple levels of access permission and allows a different level of access permission from the multiple levels of access permission to the respective application in the plurality of applications based on a user role associated with a user accessing the respective application;
receive, at the identity management system, a user profile associated with a user, the user profile including
an established login credential associated with the user and stored in the user profile for allowing access to at least a first application and a second application of the plurality of applications,
a user role associated with the user for defining a user level of access permission to the first application and to the second application, and
an indication that the second application is to be automatically started and authenticated upon successful authentication of the user to access the first application;
receive, at the identity management system, an access request for the user to access the first application;
responsive to the access request, authenticate the user to access the first application by comparing a submitted login credential received from the user with the established login credential associated with the user and stored in the user profile;
upon successful authentication of the user to access the first application, determine the user role associated with the user; and
upon successful authentication of the user to access the first application and based upon the indication that the second application is to be automatically started and authentication upon successful authentication of the user to access the first application, automatically start the second application and authenticate the user to access the second application, and
allow access to functions of the first application and to functions of the second application corresponding to the determined user role.

12. The system of claim 11, wherein registering the plurality of applications includes registering a plurality of user roles for each respective application, in the plurality of applications, each respective user role in the plurality of user roles identifying user entitlement to access specific functions provided by the respective application.

13. The system of claim 12, wherein the plurality of user roles includes a first role and a second role, the first role provides access to a first set of functions of the respective application, the second role provides access to a second set of functions of the respective application, and the first set of functions excludes certain functions included in the second set of functions.

14. The system of claim 13, wherein when access permission based on the first role is granted to the user, the excluded functions are visible to the user and deactivated.

15. The system of claim 14, wherein when the user granted access permission based on the first role selects the one or more excluded functions, an error message is provided to the user indicating that the user does not have access rights to the one or more excluded functions, the memory further storing executable instructions for causing the processing device to:
receive an authorization request from the user for accessing the one or more excluded functions;
obtain an approval for the authorization request; and
update the user profile to include a role associated with the one or more excluded functions in response to the approval being obtained.

16. The system of claim 11, the memory further storing executable instructions for causing the processing device to:
receive, at the identity management system, a request to register a new application; and
update, for each user the user profile such that the user profile includes an established login credential associated with the user and stored in the user profile for allowing access to the new application, a user role associated with the user for defining a user level of access permission to the new application, and a indication that the new application is to be automatically started and authenticated upon successful authentication of the user to access the first application.

17. The system of claim 11, wherein the user profile includes a plurality of user roles associated with the user for defining multiple levels of access permission to the first application and a plurality of user roles associated with the user for defining multiple levels of access permission to the second application.

18. The system of claim 11, wherein the user profile includes two or more user roles associated with the user for accessing an application from the plurality of applications.

19. The system of claim 11, wherein authenticating the user includes simultaneous authentication of the user for access to the first application and the second application based on the indication in the user profile.

20. The system of claim 11, wherein the user role is predetermined on a user category associated with each user, the memory further storing executable instructions for causing the processing device to:
    update the user profile to include an updated user role associated with the user category, when the user role of the user category is updated.

\* \* \* \* \*